United States Patent
Esfahani

(10) Patent No.: US 11,172,125 B2
(45) Date of Patent: Nov. 9, 2021

(54) METHOD AND A SYSTEM TO PROVIDE AERIAL VISUALIZATION OF LARGE LANDSCAPE AREA

(71) Applicant: Mehdi Zarrabi Esfahani, Kuala Lumpur (MY)

(72) Inventor: Mehdi Zarrabi Esfahani, Kuala Lumpur (MY)

(*) Notice: Subject to any disclaimer, the term of this patent is extended or adjusted under 35 U.S.C. 154(b) by 0 days.

(21) Appl. No.: 16/240,808

(22) Filed: Jan. 7, 2019

(65) Prior Publication Data
US 2021/0168283 A1    Jun. 3, 2021

(51) Int. Cl.
| H04N 5/247 | (2006.01) |
| H04N 5/232 | (2006.01) |
| G06K 9/00 | (2006.01) |
| G06T 3/00 | (2006.01) |
| G06T 7/00 | (2017.01) |

(52) U.S. Cl.
CPC ....... *H04N 5/23238* (2013.01); *G06K 9/0063* (2013.01); *G06K 9/00771* (2013.01); *G06T 3/0087* (2013.01); *G06T 7/0002* (2013.01); *H04N 5/247* (2013.01); *G06T 2207/10032* (2013.01); *G06T 2207/30168* (2013.01)

(58) Field of Classification Search
None
See application file for complete search history.

(56) References Cited

U.S. PATENT DOCUMENTS

| 2017/0010623 A1* | 1/2017 | Tang | G01C 3/00 |
| 2018/0061249 A1* | 3/2018 | Cui | G08G 5/0013 |
| 2020/0184706 A1* | 6/2020 | Speasl | G06T 15/04 |

* cited by examiner

*Primary Examiner* — Eileen M Adams
(74) *Attorney, Agent, or Firm* — Maschoff Brennan

(57) ABSTRACT

The present invention provides, a system and a method for aerial visualization. The system includes at least one ground pointing image capturing device and at least one sky pointing image capturing device mounted on at least one aerial object and configured to capture a plurality of images, a mesh network of predefined shooting points identified to station the aerial object for capturing the plurality of images, wherein the ground pointing image capturing device includes a ground pointed sensor and a lens configured to point at different directions on ground. The ground pointing image capturing device rotates the ground sensor and the lens on horizontal and vertical axis while synced with a sky pointed sensor and lens of the sky pointing image capturing device when the at least one aerial object is stationed at one of the predefined shooting points. The system includes a processor configured to stitch the plurality of captured images for converting them to spherical panoramic images and displaying the stitched spherical panoramic images on a computing device of a user for visualization.

22 Claims, 3 Drawing Sheets

METHOD AND A SYSTEM TO PROVIDE AERIAL VISUALIZATION OF LARGE LANDSCAPE AREA

FIELD OF THE INVENTION

The present invention relates to aerial visualization. More particularly, the invention relates to method and system to provide aerial visualization of large landscape area.

BACKGROUND

Aerial visualization platforms are well known in the art. One of the existing methods provides aerial imagery and geospatial content of the earth taken from satellites that are orbiting around the earth. However, in practical scenario, the visual results from this method is poor due to multiple reasons, including long distance shooting, low resolution, single angle of view from top, two-dimensional projection type, and visibility issues on cloudy areas. Further, the existing method is unable to regularly update the imagery and also unable to visualize at night due to speed of the satellite.

Another existing method uses aircraft and fly them on directional paths to capture aerial images. The aircrafts are closer to the earth compared to satellite and are able to deliver a better-quality visual compared to the satellites. However, in practical scenario, the visual results from this method is still poor due to multiple reasons including resolution, long distance shooting, providing top and low oblique angle of view only and two-dimensional projection type. Further, this existing method is unable to regularly update the imagery and also unable to provide night visuals due to fast moving aircraft.

The existing systems to visualize aerial landscapes use high resolution camera systems with multiple sub elements as part of the system to increase the resolution. It takes images while the vehicle is moving in a directional path. However, such systems are extremely costly and requires additional hardware to make them bulky. Further, the existing visualization systems and method are extremely complex in nature.

In view of the above, there exists a need of improved systems and methods for aerial visualization.

SUMMARY OF THE INVENTION

Accordingly, the present invention provides, a system for aerial visualization. The system includes at least one ground pointing image capturing device and at least one sky pointing image capturing device. Each of the image capturing devices are mounted on at least one aerial object and configured to capture a plurality of images. The system includes a mesh network of predefined shooting points identified to station the aerial object for capturing the plurality of images, wherein the device includes at least one ground sensor and a lens configured to point at different directions on ground and the device includes at least one sky pointed sensor and lens configured to point at different directions on sky. The ground pointed image capturing device rotates the ground pointed sensor and lens on horizontal and vertical axis when the at least one aerial object is stationed at one of the predefined shooting points during image capturing. The system includes a processor configured to process the plurality of captured images to convert them to spherical panoramic images and displaying the panoramic images on a computing device of a user for visualization.

In an embodiment the present invention provides a method for aerial visualization. The method comprises the steps of identifying a plurality of predefined shooting points to create a mesh network wherein at least one aerial object is stationed at each of the plurality of shooting points for capturing a plurality of images by at least one ground pointing image capturing device and at least one sky pointing image capturing device. The method includes the step of rotating at least one ground pointed sensor and a lens of the ground pointing image capturing device on horizontal and vertical axis while syncing with at least one sky pointed sensor and lens of the sky pointing image capturing device when the at least one aerial object is stationed at one of the predefined shooting points. Further the method includes in response to the rotation, pointing the ground pointing image capturing device and sky pointing image capturing device at different locations on ground and sky. The method includes the step of capturing a plurality of images by the at least one ground pointing image capturing device and the sky pointing image capturing device mounted on the at least one aerial object and processing the plurality of captured images by a processor and converting them to spherical panoramic images and displaying them on a computing device of a user for visualization.

In an advantageous aspect, the present invention visualizes large landscape areas from aerial point of view in regular bases and spherical panoramic format. It provides better quality, precision and practicality compare to the current methods in the market. It is also less complex, efficient, cost effective and updates in a shorter period of time.

To record the images/visuals, it uses high definition automatic image capturing device/camera system attached to a drone flying in the air and captures plurality of individual images from each predefined shooting point. Based on the property of landscape, shooting points are defined in a mesh network above the ground with the same or variable height and equal or variable distances among each.

The precision of the mesh network visualization method is scalable, lower distance between each shooting point will bring higher precision and longer distance between them brings lower precision. The precision of spherical panoramic images is also scalable depending on focal length of the lens, the higher focal length enables higher precision and lower focal length lower precision.

In an embodiment the present invention introduces an exemplary method and type of obtaining and projecting images respectively. It uses drone and high-speed panoramic camera system with periodic shooting schedule to produce high definition spherical panoramic images closer to the earth in a mesh format. Apart from visual clarity for clear exploration, it enables many practicality features like measurement tools including width, height and depth, object recognition, face detection, calculation of area and volume, change detection in entities and many more.

DESCRIPTION OF THE INVENTION

Figure 1:
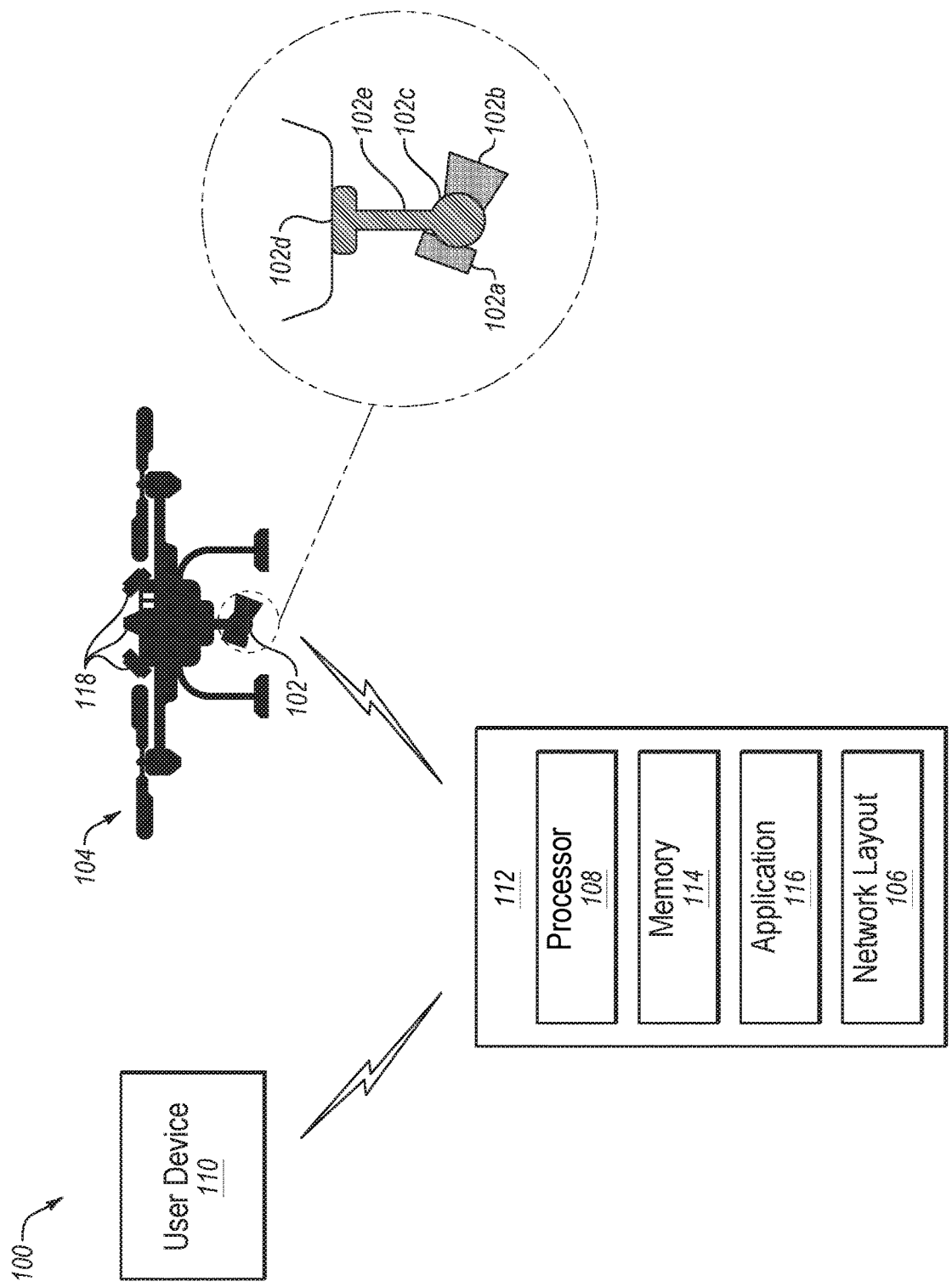
FIG. 1 shows a system for aerial visualization in accordance with an embodiment of the present invention.

Various embodiment of the present invention provides a system and a method for aerial visualization. The following description provides specific details of certain embodiments of the invention illustrated in the drawings to provide a thorough understanding of those embodiments. It should be recognized, however, that the present invention can be reflected in additional embodiments and the invention may be practiced without some of the details in the following description.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "layer," "platform" and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

Embodiments described herein will refer to plan views and/or cross-sectional views by way of ideal schematic views. Accordingly, the views may be modified depending on simplistic assembling or manufacturing technologies and/or tolerances. Therefore, example embodiments are not limited to those shown in the views but include modifications in configurations formed on basis of visualization process. Therefore, regions exemplified in the figures have schematic properties and shapes of regions shown in the figures exemplify specific shapes or regions of elements, and do not limit the various embodiments including the example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for aerial visualization.

This method provides aerial views closer to the earth from approx. lower than 500 meter height that can bring clear visuals and a practical angle of view. The angle of view practicality will enable measurement tools to calculate height, depth and distance between two points in a spherical panoramic image within visualization platform. the result will bring more tools like calculating the area of surfaces and volume of objects. Capturing images closer to the ground will bring higher precision which enables object recognition tools to analyze and detect smaller entities in the visuals.

Referring to FIG. 1 a system 100 for aerial visualization is provided in accordance with an embodiment of the present invention. The system 100 includes at least one ground pointing image capturing device 102 mounted on at least one aerial object 104 and configured to capture a plurality of images, a mesh network 106 (FIG. 1a) of predefined shooting points identified to station the aerial object 104 for capturing the plurality of images, wherein the device 102 includes a ground pointed sensor 102a and a lens 102b configured to point at different directions on ground. The image capturing device 102 rotates the ground pointed sensor and the lens on horizontal and vertical axis while synced with sky pointed sensors and lenses 118 configured to point at different directions on sky when at least one aerial object 104 is stationed at one of the predefined shooting points during image capturing, and a processor 108 configured to stitch the plurality of captured images and convert them to spherical panoramic images. The spherical panoramic images are displayed on a computing device 110 of a user for visualization. Further, the image capturing device 102 includes vertical rotation motor 102c and horizontal rotation motor 102d for enabling the device 102 to rotate the sensor 102a and lens 102b. The device 102 includes a communication and processing device 102e for processing and transferring images.

Figure 1A:
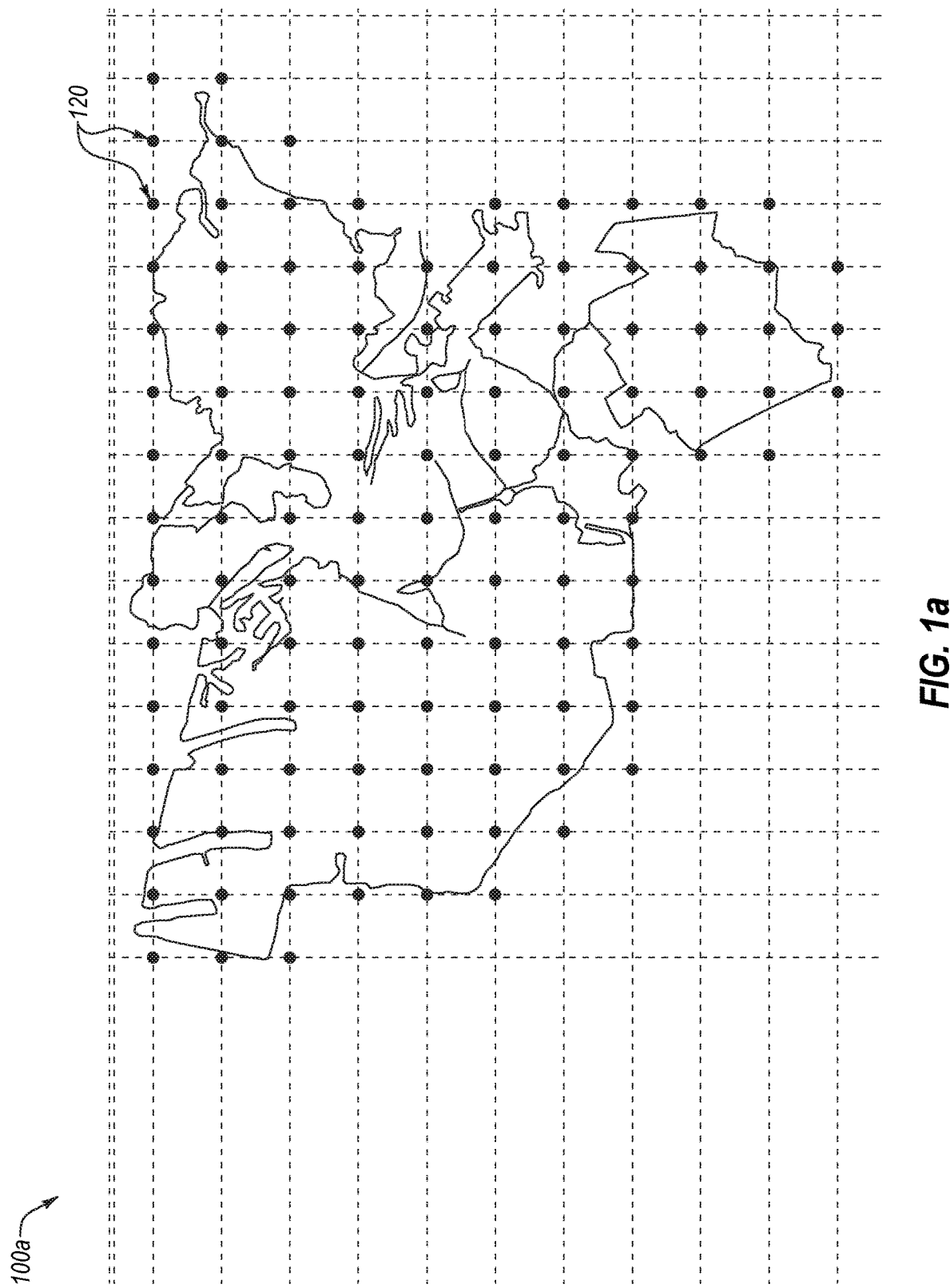
FIG. 1a shows a graph depicting a mesh network of shooting points in accordance with an embodiment of the present invention.

Referring to FIG. 1a a graph (100a) depicting the mesh network 106 with shooting points 120 of the present invention is shown.

In an embodiment, referring to FIGS. 1 and 1a, the network 106 of shooting points 120 is distributed in a mesh format as part of an aerial visualization platform 112 where the shooting points 120 are defined in equal or variable height and distance among each other. The system 100 of the present invention re-captures and updates the visuals within limited time say approximately two months from the exact same shooting locations. Having close distance, high definition spherical panoramic visuals with high oblique angle taken from the same point say every two months enables comparison tools to detect changes in position, scale, shape and color of the entities on the ground in scalable precision.

In an embodiment, the processor 108 is configured to execute computer-executable instructions stored in a memory 114 and associated with the image capturing device and the mesh network.

In a related embodiment a computer application 116 is designed to manage and process data in web or any other format to display the spherical panoramic images wherein the application provides comparison tools to automatically detect changes like scales, shapes, positions and colors within the images to allow inspection, review and analysis of the changes that occurs in the property of landscape area for the purpose of safety, security and protection of built or natural environment as well as humans and animals.

In an exemplary embodiment, production of a high definition spherical panoramic image from one point, depends on required resolution, dozens or hundreds of images that are needed to be taken from all angles on the ground within a very short time with the drone stationed in its position in the air without moving or shaking. Photography equipment's are mounted on a high-speed robotic device (camera system). The device triggers and turns the camera and lens in horizontal and vertical angle while attached to the aerial object like a flying drone.

In an exemplary embodiment, the ground pointed camera system produces higher resolution panoramic image from the ground by taking higher number of individual images using higher focal length configuration and rotational camera/lens. The sky pointed cameras produce lower resolution panoramic image from the sky by taking lower number of individual images using lower focal length configuration and static cameras/lenses. Further, the individual images are stitched together to produce both the sky and the ground panoramic view. The resolution of sky panoramic view will be increased digitally by adding pixels during the processing to match with the resolution of ground panoramic view. The final spherical panoramic image is the combination of ground and sky panoramic view stitched together.

In an embodiment, to capture the view of sky from the same shooting point 120, sky pointed cameras get mounted on the top side of drone pointing to different directions at the sky, they operate at the same time that the high definition camera system takes images from the ground. Each spherical panoramic image taken from shooting points 120 consists of ground and sky view which are taken separately by high definition camera system and a plurality of sky pointed cameras 118 respectively. They are being stitched together during processing.

In an exemplary embodiment, the capturing time of sky/top images are the same as ground images at each shooting point. All application features are available for sky view similar to ground section view, but they are limited due to the lower resolution of sky section panoramic image.

In an embodiment, the present invention uses a high-speed capturing device/camera system 102 which includes one image sensor and one lens which are pointed at different directions on the ground. The system 102 rotates the sensor and the lens on horizontal and vertical axes while attached to the flying vehicle 104 which is going to be stationed in one position in air during image capturing.

In an exemplary embodiment, the final results are managed by the computer application 116 to display the visuals on any digital user devices 110 including but not limited to tablet, smartphone and virtual reality devices. The visualization platform 112 consists of many high definition spherical panoramic images that has been taken from aerial shooting points 120 and being displayed on end user devices 110. Due to the type of images that are in spherical panoramic format, the application enables the end user to use virtual reality device and explore the visuals and even fly over the landscape i.e it enables a user to use virtual reality devices and explore the photo realistic virtual version of the landscape environment from aerial point of view, for example user can have the experience of flying over a city.

In an exemplary embodiment, apart from visual explorations, there are additional practicality features like measurement tools, object recognition tool, face detection and change detection tool delivered by the computer application 116.

In an embodiment, the measurement tools calculate the distance between two points in the image. Since the images are in spherical panoramic format with high oblique angle of view, heights and depths also can be measured which enables the calculation of surface area and the volume of objects.

In another embodiment, the object recognition is a tool to automatically identifies an entity in the image. Since the visualization is from a close distance to the ground and high resolution, it can provide a sharp and clear image. It is also in spherical panoramic format that bring sufficient oblique angle of view to deliver enough depth. A combination of both enables a high precision object recognition tool within the visuals.

In yet another embodiment of the present invention, the change detection is a practical tool to highlight changes that occur in the entities within the visuals in a period of time. Since the visuals are regularly being updated from the exact same shooting points 120 with the same format and high precision. It enables comparison tools to detect changes in position, scale, shape, color or other property of an entity in the spherical panoramic image.

The disclosed system architecture captures (analyzes, selects, and/or reformats) a set of images from repositories or sources of images to create one-dimensional (1D) and two-dimensional (2D) image manifolds. Each manifold is configured to arrange and prepare the images for visualization. The repositories of spherical panoramic images include aerial views and terrestrial views (from points on or close to earth surface) of locations, scenes and objects in the scenes, for example. The resulting image provides an interactive view navigation experience of the location or scene via the images of the packet.

Figure 2:
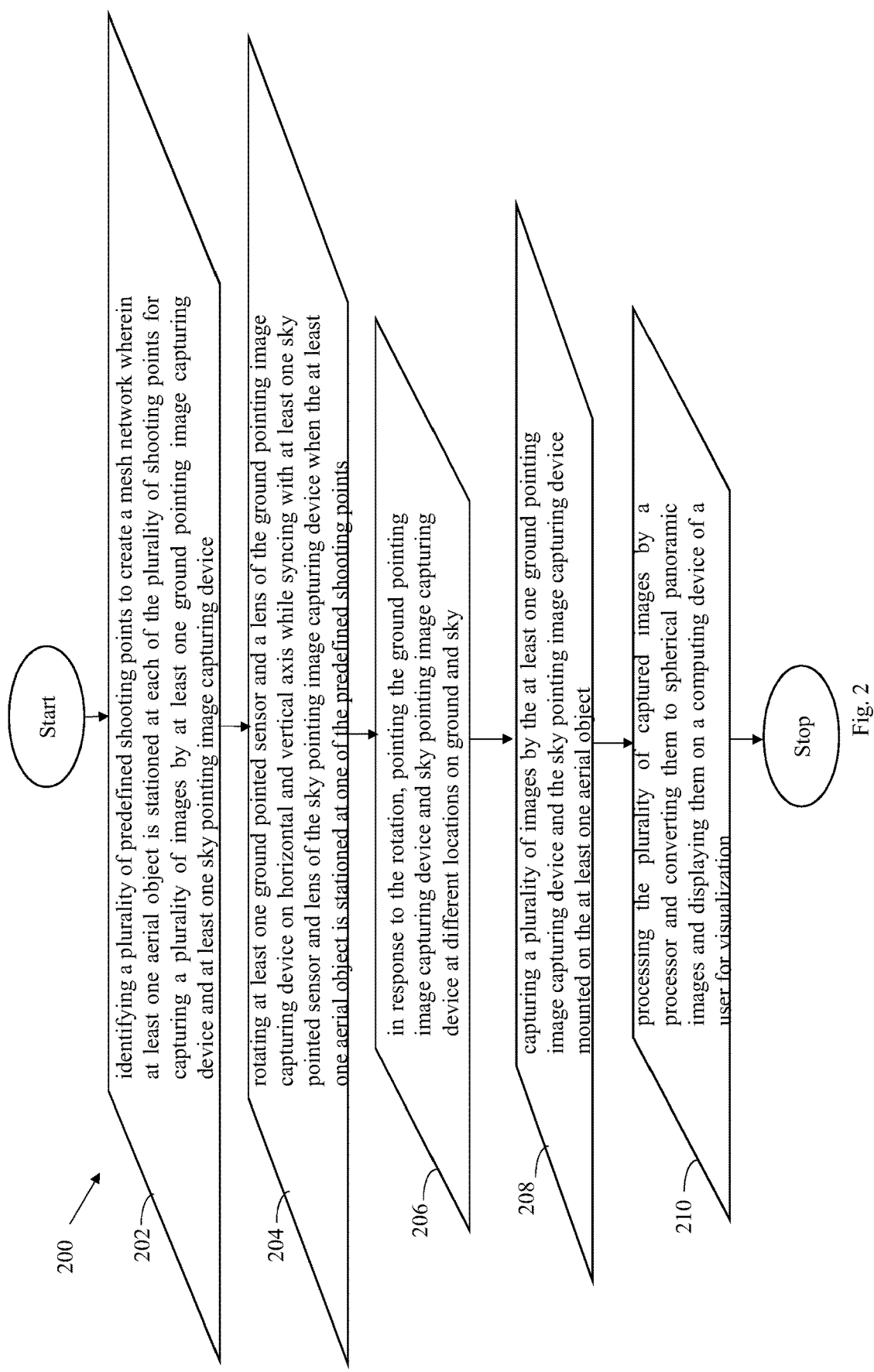
FIG. 2 shows a flowchart depicting a method for aerial visualization in accordance with an embodiment of the present invention.

Referring to FIG. 2, a flowchart 200 depicting a method for aerial visualization is provided in accordance with an embodiment of the present invention. The method comprises the steps of S202 identifying a plurality of predefined shooting points to create a mesh network wherein at least one aerial object is stationed at each of the plurality of shooting points for capturing a plurality of images by at least one ground pointing image capturing device and at least one sky pointing image capturing device. In S204 rotating at least one ground pointed sensor and a lens of the ground pointing image capturing device on horizontal and vertical axis while syncing with at least one sky pointed sensor and lens of the sky pointing image capturing device when the at least one aerial object is stationed at one of the predefined shooting points. In S206 in response to the rotation, pointing the ground pointing image capturing device at different locations on ground. In S208 capturing a plurality of images by the at least one ground pointing image capturing device and the sky pointing image capturing device mounted on the at least one aerial object and in S210 processing the plurality of captured images by a processor and converting them to spherical panoramic images and displaying them on a computing device of a user for visualization.

In an exemplary embodiment the image production method and the type of aerial images generated from the visualization system are high precision images. Since, the method uses drone with high speed panoramic camera system to obtain images from predefined shooting points 120 designed in a mesh format, the type of aerial images are high definition spherical panoramas which are providing a complete zoomable view to all direction from one shooting point 120. Both horizontal and vertical view covers 360 degree angle of view.

In an advantageous aspect, the method and the system of the present invention function during night time and produce similar results as day time. Even if, certain features are limited due to lower amount of illumination in the environment, the characteristic of visualization is the same. For example, the images are in spherical panoramic format, but the resolution, sharpness and visibility may be lower.

It shall be apparent to a person skilled in the art that the method is explained in relation to landscape area, but it can be implemented to visualize indoor places as well, for example, a factory, warehouse or even a normal house without departing from the scope of the invention. Further, it even can work on the sea or any type of areas that need to be visualized.

In an exemplary embodiment, the size of the whole system varies depending on the requirements of use, for example it is designed bigger if it requires to use bigger lenses and sensors and it is small if it needs to use smaller lenses and sensors. The type of lenses and sensors depends on required resolution, the design of mesh network, shooting points and the property of landscape/area.

In an exemplary embodiment, the method and system of the present invention is not limited to use single aerial device and camera system at the time, as it can be configured to synchronize functioning of multiple aerial devices with camera system as part of a group synchronization to perform together at the same time in order to capture images from a landscape area in a shorter period of time.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

The system may deploy computer that can be one of several computers employed in a datacenter and/or computing resources (hardware and/or software) in support of cloud computing services for portable and/or mobile computing systems such as wireless communications devices, cellular telephones, and other mobile-capable devices. Cloud computing services include, but are not limited to, infrastructure as a service, platform as a service, software as a service, storage as a service, desktop as a service, data as a service, security as a service, and APIs (application program interfaces) as a service, for example.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage.

The word "exemplary" is used herein to mean "serving as an example." Any embodiment or implementation described as "exemplary" is not necessarily to be construed as preferred or advantageous over other embodiments or implementations.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

The above-described embodiments of the present invention may be implemented in any of numerous ways. For example, the embodiments may be implemented using various combinations of hardware and software and communication protocol(s). Any standard communication or network protocol may be used and more than one protocol may be utilized. For the portion implemented in software, the software code may be executed on any suitable processor or collection of processors, whether provided in a single computer or distributed among multiple computers. Such processors may be implemented as integrated circuits, with one or more processors in an integrated circuit component, or any other suitable circuitry. Further, it should be appreciated that a computer may be embodied in any of a number of forms, such as a rack-mounted computer, a desktop computer, a laptop computer, single board computer, microcomputer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools or a combination of programming languages, and also may be compiled as executable machine language code or intermediate code that is executed on a framework or a virtual machine. In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the appended claims.

What is claimed is:

1. A system for aerial visualization comprises:
at least one ground pointing image capturing device and at least one sky pointing image capturing device being configured to be mounted on at least one aerial object and to capture a plurality of images;
a mesh network of predefined shooting points identified to station the aerial object for capturing the plurality of images;
wherein the device includes at least one ground sensor and a lens being configured to point at different directions on ground and the device includes at least one sky pointed sensor and lens being configured to point at different directions on sky wherein the image capturing device rotates the ground pointed sensor and lens on horizontal and vertical axis when the at least one aerial object is stationed at one of the predefined shooting points during image capturing,
a processor configured to process the plurality of captured images to convert them to spherical panoramic images and displaying the panoramic images on a computing device of a user for visualization, a measurement tool being configured to calculate a distance between two points in the image wherein the images are in spherical panoramic format with perspective view that enables measurement of heights and depths to determine surface area and volume of objects on ground.

2. The system of claim 1 further comprises an object recognition tool being configured to automatically identify an entity in the image wherein visualization of objects is from a close distance to the ground in high definition thereby providing a sharp and clear image.

3. The system of claim 2 further comprises a change detection tool being configured to highlight changes that occur in the entities within the images over a period of time wherein the images are regularly being updated from exactly same shooting points with same format and high precision thereby enabling detection of changes in position, scale, shape, color or other property of the entity in the spherical panoramic images.

4. The system of claim 1 wherein the spherical panoramic images provide a complete zoomable view to all direction from one shooting point as both horizontal and vertical view are captured thereby covering 360 degree angle of view.

5. The system of claim 4 wherein a computer application is designed to manage and process data in a web format to display the images wherein the application provides comparison tools to automatically detect changes like scales, shapes, positions and colors within the images to allow inspection, review and analysis of the changes that occurs in entities and property of landscape area for the purpose of safety, security and protection of built or natural environment as well as humans or animals.

6. The system of claim 5 wherein based on property of landscape the shooting points are defined in the mesh network above ground with each point at the same or variable height and equal or variable distance from each other.

7. The system of claim 6 wherein precision of the mesh network visualization is scalable as lower distance between each shooting point enables higher precision and longer distance between them leads to lower precision wherein the precision of the panoramic images is also scalable depending on focal length of the lens, the higher focal length enables higher precision and lower focal length lower precision.

8. The system of claim 1 wherein the processor is being configured to execute computer-executable instructions stored in a memory and associated with the image capturing device and the mesh network.

9. The system of claim 1 wherein producing a high definition spherical panoramic image from one point, depends on required resolution dozens or hundreds of images are taken from all angles on the ground within a very short time till the aerial object is stationed in its position in air without moving or shaking.

10. The system of claim 1 wherein the at least one sky pointed camera mounted on the aerial object pointing to different direction at sky captures the view of the sky from a same shooting point, wherein the cameras operate at same time that the image capturing device takes images from the ground.

11. The system of claim 1 wherein the aerial object is a drone configured to fly to the shooting points of the mesh network and be stationed there for capturing images.

12. The system of claim 1 wherein the predefined shooting points of the mesh network are such that it provides aerial views closer to the earth from approx. less than 500 meter distance to the earth that provides clear images.

13. The system of claim 1 wherein the plurality of images include at least one ground pointing panoramic image and a sky pointing panoramic image.

14. A method for aerial visualization comprises the steps of:
identifying a plurality of predefined shooting points to create a mesh network wherein at least one aerial object is stationed at each of the plurality of shooting points for capturing a plurality of images by at least one ground pointing image capturing device and at least one sky pointing image capturing device;
rotating at least one ground pointed sensor and a lens of the ground pointing image capturing device on horizontal and vertical axis while syncing with at least one sky pointed sensor and lens of the sky pointing image capturing device when the at least one aerial object is stationed at one of the predefined shooting points;
in response to the rotation, pointing the ground pointing image capturing device at different locations on ground and sky;
capturing a plurality of images by the at least one ground pointing image capturing device and the sky pointing image capturing device mounted on the at least one aerial object,
processing the plurality of captured images by a processor and converting them to spherical panoramic images and displaying them on a computing device of a user for visualization,
calculating a distance between two points in the spherical panoramic image with perspective view that enables measurement of heights and depths to determine surface area and volume of objects on ground.

15. The method of claim 14 further comprises the step of pointing the sky pointing image capturing device at different locations on sky.

16. The method of claim 15 further comprises the step of automatically identifying an entity in the image wherein visualization of objects is from a close distance to the ground in high definition thereby providing a sharp and clear image.

17. The method of claim 16 further comprises the step of highlighting changes that occur in the entities within the images over a period of time wherein the images are regularly updated from exactly same shooting points with same format and high precision thereby enabling detection of changes in position, scale, shape, color or other property of the entity in the spherical panoramic image.

18. The method of claim 14 wherein the spherical panoramic images are high definition images that provide a complete zoomable view to all direction from one shooting point as both horizontal and vertical view are captured thereby covering 360 degree angle of view.

19. The method of claim 14 wherein based on a property of landscape the shooting points are defined in the mesh network above ground with each point at same or variable height and equal or variable distance from each other.

20. The method of claim 19 wherein precision of the mesh network visualization is scalable as lower distance between each shooting point enables higher precision and longer distance between them leads to lower precision wherein the precision of spherical panoramic images is scalable depending on focal length of the lens, the higher focal length enables higher precision and lower focal length lower precision.

21. The method of claim 14 further comprises the step of capturing plurality of images from all angles on the ground and sky within a very short time till the aerial object is stationed in its position in air without moving or shaking to produce a high definition spherical panoramic image from one point.

22. The method of claim 14 further comprises the step of synchronizing functioning of a plurality of aerial objects equipped with at least one image capturing device each as part of a group synchronization to capture ground pointing images and sky pointing images at same time in order to capture images from a landscape area in a shorter period of time.

* * * * *